(12) United States Patent
Silver

(10) Patent No.: US 7,585,536 B2
(45) Date of Patent: Sep. 8, 2009

(54) COMPOSITIONS OF FRUCTOSE AND GLUCOSE CONTAINING INULIN

(76) Inventor: Barnard S. Silver, 4390 S. 2300 East, Holladay, UT (US) 84124-3651

( * ) Notice: Subject to any disclaimer, the term of this patent is extended or adjusted under 35 U.S.C. 154(b) by 169 days.

(21) Appl. No.: 11/076,480

(22) Filed: Mar. 9, 2005

(65) Prior Publication Data

US 2005/0266135 A1 Dec. 1, 2005

Related U.S. Application Data

(63) Continuation-in-part of application No. 10/855,138, filed on May 27, 2004, now abandoned.

(51) Int. Cl.
*A23L 1/08* (2006.01)
*A23L 1/09* (2006.01)
(52) U.S. Cl. .................. 426/548; 426/518; 426/583; 426/658
(58) Field of Classification Search ................ 426/658, 426/548, 518, 74, 620, 615, 640, 639
See application file for complete search history.

(56) References Cited

U.S. PATENT DOCUMENTS

| | | |
|---|---|---|
| 4,050,952 A | 9/1977 | Liebl |
| 4,311,722 A | 1/1982 | Vink et al. |
| 4,421,852 A | 12/1983 | Hoehn et al. |
| 5,527,556 A | 6/1996 | Frippiat et al. |
| 6,010,735 A | 1/2000 | Frippiat et al. |
| 6,123,980 A * | 9/2000 | Pearson et al. ............ 426/658 |
| 6,419,978 B1 | 7/2002 | Silver |
| 6,521,276 B1 | 2/2003 | Frippiat |
| 2003/0138520 A1 | 7/2003 | Bell et al. |
| 2005/0074442 A1* | 4/2005 | Ranganathan ............ 424/93.45 |

FOREIGN PATENT DOCUMENTS

| | | |
|---|---|---|
| JP | 8-154615 | 6/1996 |
| JP | 408154615 A * | 6/1996 |
| WO | WO 96/20266 | 7/1995 |

OTHER PUBLICATIONS

Squires, Sally 2003 "Sweet but not so innocent". www.washingtonpost.com/ac2/wp-dyn/A8003-2003Mar10?.*
Lee, F. Basic Food Chemistry, The Avi Publishing Co., Inc. 1975, Westport, CN, p. 16.*
White, Jr., J.W. & Doner, Landis W., *Honey Composition and Properties*, Beekeeping in the United States Agriculture Handbook No. 335, Revised Oct. 1980.
http://www.hfcsfacts.com/Safety.htm.
http://web.archive.org/web/20001202055100/http://www.honeyshop.co.uk/effect.html Dec. 2, 2000.

* cited by examiner

*Primary Examiner*—Helen F Pratt
(74) *Attorney, Agent, or Firm*—Brinks Hofer Gilson & Lione

(57) ABSTRACT

Crystallization of glucose in compositions such as high fructose corn syrup or honey is reduced by adding as little as 0.25% by weight of inulin. The addition of inulin to honey reduces stickiness and increases the viscosity to allow the sweetener composition to retain its shape when molded. A honey and inulin composition can be added to chocolate without separation. A honey and inulin composition can be mixed with powdered milk without separation.

35 Claims, No Drawings

COMPOSITIONS OF FRUCTOSE AND GLUCOSE CONTAINING INULIN

RELATED APPLICATIONS

The present patent document is a continuation-in-part of parent application Ser. No. 10/855,138, filed May 27, 2004 now abandoned, which is incorporated herein by reference. If there is any inconsistency between the parent application and the present patent document, the present patent document shall prevail.

FIELD OF THE INVENTION

This invention relates to compositions of fructose and glucose containing inulin, and to foods and electuaries containing the same.

BACKGROUND

Two well-known compositions of fructose and glucose are sold today in large commercial quantities: namely, high fructose corn syrup (HFCS) and honey.

HFCS, produced from corn starch in a multiple enzyme process, is a concentrated water solution of two monosaccharide sugars, fructose and glucose. Typically, HFCS contains, on a dry weight basis, 43% fructose and 52% glucose. The typical water content is 28.5% to 29.5%.

HFCS is stored typically at temperatures from 21° C. to 38° C., preferably from 32° C. to 38° C. to prevent crystallization of the glucose. Uncontrolled crystallization of glucose occurs upon storage over time, especially at lower temperatures, producing crystal deposits in the HFCS.

Honey, a natural sweetener produced by bees, is a highly concentrated water solution of two principal sugars, fructose and glucose, together with small amounts of at least 22 other more complex sugars, several natural enzymes, 11 minerals, 12 amino acids and 9 vitamins.

The high concentration of the sugars fructose (38%) and glucose (31%) influences many of the characteristic properties of honey: high viscosity, "stickiness", high density, hygroscopicity, granulation tendencies, antibacterial activity and immunity from some types of spoilage.

Another influential ingredient of honey is water. The amount of water influences spoilage, granulation and body.

The natural water content of honey in the comb is that remaining after ripening of the honey by the bees. Other factors affecting the amount of water are weather conditions and the amount of moisture in the nectar gathered by the bees.

The water content of natural honey may vary between 13% and 25%. However, under the United States Standards for Grades of Extracted Honey, honey must not contain more than 18.6% water to qualify for U.S. Grade A (U.S. Fancy) and U.S. Grade B (U.S. Choice) honey. Grade C honey may contain up to 20% water. These values represent upper limits of water, and do not represent the preferred water content. If honey has more than 17.1% water and contains a sufficient number of natural yeast spores, the honey will ferment. The most important cause of fermentation in honey is an increase of the water content. It is known that honey with less than 17.1% by weight of water will not ferment in a year, irrespective of the yeast spore count. White, et al., *Honey Compositions and Properties*, BEEKEEPING IN THE UNITED STATES, AGRICULTURAL HANDBOOK NO. 335, (revised October 1980).

Undesirable uncontrolled granulation of honey, which occurs over time, that results from crystallization of glucose to glucose hydrate, is a natural process for most honey. Uncontrolled granulation is undesirable, among other things, because granulation imparts an undesirable cloudy appearance, and changes the color of the original honey. Uncontrolled granulation is avoided by many honey processors by heating to elevated temperatures in the range from 60°-63° C. for 30 minutes, or flash pasteurization at 77° C. for a few seconds. The heating is believed to dissolve seed crystals of sugars which promote crystallization. However, by heating to those elevated temperatures, at least some of the natural constituents of honey start to be destroyed, such as the enzymes and vitamins.

Natural honey does not mix well with powdered products. For example, if powdered milk is mixed with natural honey, often stratification will occur, or a layer of milk and water formed upon standing.

The liquid viscous, sticky properties of natural honey are not conducive to being handled as a piece of candy. The liquid and sticky properties of honey have limited its uses and applications.

OBJECTS OF THE INVENTION

It is, therefore, an object of the invention to reduce the tendency of compositions of fructose and glucose, for example, HFCS and honey, to form crystals of glucose.

It is also an object of the invention to preserve as far as possible, the original color of the honey, and to reduce the tendency of glucose in honey to crystallize, especially by reducing the tendency to crystallize without heating to temperatures that start the degradation of some of the important ingredients, for example the enzymes and vitamins.

It is, further, an object of the invention to provide compositions of honey that retain their shape and can be wrapped or dipped.

It is a yet further object of the invention to provide compositions of honey in which the stickiness characteristic of honey is reduced, so that the honey composition can be picked up and deposited by the fingers at ambient temperatures without sticking.

It is a still further object of the invention to provide a composition of honey characterized by the properties of a solid or semi-solid article, but not hard (like hard-candy), rather than those of viscous liquid.

It is another object of the invention to provide a composition of honey having a reduced tendency to ferment.

It is still yet another object of the invention to provide a mixture of inulin, honey and at least one powdered product that has reduced stratification, or separation of layer upon standing.

It is still another object of the invention to provide a composition of honey in order to at least partially reduce the tendency to crystallize.

It is another object of the invention to provide a food composition that will satisfy the cravings of the body for sweetness, fat, and a sense of fullness in the stomach.

It is yet another object of the invention to provide a sweetness composition of honey that can be used to make various foods, confections, candies, breads, muffins, and is suitable as an electuary.

The above, and other objects of the invention, will be clear from the following detailed description and appended claims.

DETAILED DESCRIPTION OF A PREFERRED EMBODIMENT OF THE PRESENT INVENTION

It has now been discovered that by adding inulin, or the water soluble fractions of inulin, in amounts as little as at least 0.25%, preferably at least about 2% and desirably at least about 5%, by weight of the weight amounts of glucose, for example, in HFCS reduces the tendency of glucose to crystallize.

It also has been discovered that by adding inulin, or the water soluble fractions of inulin, to honey in amounts as little as at least about 0.25%, preferably at least about 4%, and desirably at least about 10%, by weight of the weight of honey, the tendency to crystallize is reduced, without needing to follow the customary practice of heating the honey to temperatures at which the enzymes, and vitamins begin to degrade.

Since the percentage of glucose to fructose varies in honey as an uncontrolled product of the bees, and since the viscosity of honey is much higher than HFCS, and since the water content of honey is substantially lower than in HFCS, the minimum amount of inulin added to honey in order to prevent crystallization of glucose, as disclosed herein, is a higher percentage than, for example, disclosed for the HFCS composition. The minimum amounts of inulin in any particular composition are not necessarily the preferred or most desired amounts, the latter of which can be determined by persons skilled in the field.

Granulated inulin, as well as water mixtures of inulin, can be extracted from chicory root, Jerusalem artichoke, garlic, Dahlia tuber, Agave, and many other plants, by processes disclosed in U.S. Pat. No. 6,569,488, incorporated herein by reference.

Granulated water soluble products of inulin, and water solutions of the water soluble inulin products, can be manufactured by processes disclosed in U.S. Pat. No. 6,569,488, incorporated herein by reference. The water soluble inulin products comprise at least about 75% by weight of the water soluble polysaccharides of inulin having molecular weights of about 2288 and below.

A preferred composition of the inulin contains fructose in amounts from about 95% to about 5% by weight, glucose from about 5% to about 95% by weight, water from about 10% to about 50% by weight, and inulin in amounts of at least about 0.25% by weight of the weight of the glucose. Another preferred composition contains fructose in amounts from about 95% to about 5% by weight, glucose from about 5% to about 95% by weight, inulin in amounts of at least about 0.25% by weight of the weight of the glucose, and in which the final composition contains at least about 6% water, for example, the final composition broadly contains from about 6% by weight to about 60% by weight of water, and preferably from about 6% by weight to about 25% by weight of water. The highest water contents are useful, for example, in syrup compositions.

By "final composition" is meant the composition of the product as sold to the consumer.

The minimum amounts of inulin to glucose may be in some compositions at least about 2% by weight, in other compositions at least about 5% by weight, in still other compositions at least about 10% by weight, in yet other compositions at least about 15%, or 20% by weight. Examples of the preferred compositions include HFCS, such as commercial HFCS having 42%, 55% or 90% weight of fructose containing inulin with weight percentages given above.

Other examples of preferred compositions are honey compositions containing inulin in a weight ratio to the honey in minimum amounts of at least about 0.25%, 2%, 5%, 10%, 15%, or 20%.

In a preferred embodiment, sweetener compositions are made by adding inulin to honey while stirring the honey with a mechanical mixer at temperatures below about 43° C., preferably below about 42° C. The amounts of inulin added to the honey may range from about 0.25% to about 30%; preferably at least about 3% desirably at least about 5%, and most desirably at least about 10% by weight of inulin to the combination of honey and inulin.

In one embodiment, sufficient amounts of inulin are added to the honey to establish a water content contained in the honey of less than about 17.1% of the honey. The sweetener composition at the lower water levels has less of a tendency to ferment upon standing than compositions of honey having higher water levels. In the presence of inulin, however, it has been discovered that water content of the honey may range from about 6% to about 25% by weight of the honey.

It was discovered that the composition of honey and inulin tends to a solid coherent form with reduced "stickiness" compared to natural honey. If the ratio amounts of inulin to honey are sufficiently high, the sweetener composition is semi-solid, or solid, but not hard as in hard candy, and can be picked up and deposited by the fingers without sticking.

It was also discovered, as indicated above, that without heating the honey to temperatures above 43° C., the sweetener composition of honey and inulin has a reduced tendency to crystallize, and to preserve substantially the original color of the honey. The reason for the reduced tendency for honey to crystallize when mixed with inulin is not known.

The sweetener composition containing both honey and inulin also has a reduced tendency to ferment.

The mixture of inulin in the sweetener composition does not interfere with, but enhances, the characteristic taste of the natural honey.

A sweetener composition of honey and inulin may be eaten alone, spread on bread, crackers, and the like. The sweetener composition also may be admixed with ingredients of foods for food preparation, such as confections, candies, breads, or muffins. If the sweetener composition is used in food preparation, it is preferred that the food temperatures preparation be maintained below 43° C. in order to avoid degradation of some of the natural enzymes and/or vitamins in the honey.

It has been discovered that instant skim milk powder can be added to a mixture of honey and inulin without stratification upon standing. The invention, therefore, further includes inulin and honey mixtures that contain at least one powdered food product, such as, powdered carbohydrates and/or powdered proteins. For example, the inulin and honey mixture can contain instant skim milk powder, or powdered soy ingredients for making unique honey based products.

It has been discovered that when the amounts of inulin in the honey are sufficiently high, for example amounts of at least about 10%, preferably 15%, by weight inulin to honey, and especially with reduction of the water content of the honey to low levels above about 6% by weight of the honey, the honey and inulin composition substantially retains its shape when introduced into molds and cooled.

It has been further discovered that when the honey and inulin composition has sufficient amounts of inulin to honey, for example, in amounts of at least about 10%, preferably 15%, by weight inulin to honey, the composition can be further admixed with chocolate, and the cooled product substantially retains its molded shape without separation of the chocolate and the honey. Reduction in the water content of the composition during cooling, for example, can be accomplished by a freeze dryer and such water removal may improve the product firmness and non-sticky properties.

The following specific examples are given in order to further illustrate the invention without, however, intending to be any limitation on the scope of the invention.

EXAMPLE 1

Preparation of a Sweetener Containing Honey and Inulin 750 grams of natural honey was determined to contain 610.5 grams or 81.4% by weight of solids and 139.5 grams, or 18.6%, by weight of water. 122 grams of granulated inulin (extracted from chicory) was added to the honey (the inulin was 16.3% by weight of the honey) with mechanical stirring at temperatures below 43° C. The resulting water content of the honey and inulin mixture was about 16.28%. It was observed that the honey with the added inulin had reduced fluidity and reduced stickiness. Moreover, no crystallization or fermentation occurred upon standing for many months.

EXAMPLE 2

Dark Chocolate Confection 1000 grams (1 kg) of dark chocolate were melted at temperatures no higher than about 43° C. and added with mechanical stirring to a melted honey and inulin mixture prepared according to Example 1, at temperatures below 43° C. The amount of inulin in the chocolate and honey mixture was 6.5% by weight. The mixture was cooled, then formed in ropes, cut into pieces, and the cut pieces wrapped individually into soft, chewy, moldable chocolate confections that have a sweet chocolate taste, and which could be handled without sticking.

EXAMPLE 3

Pecan Confection 1000 grams (1 kg) of pecan praline melted at temperatures no higher than 43° C. and added with mechanical stirring to the melted honey and inulin mixture prepared according to Example 1 at temperatures below 43° C., and then cooled on a slab with the product dipped in chocolate. The resulting chocolate covered praline confection was a soft, chewy, moldable praline confection with a sweet praline taste, and which could be handled without sticking.

EXAMPLE 4

Pecan Confection

Example 4 was made in a larger batch with butter and pecans added. Nine and three quarters pounds of inulin were stirred into thirty pounds of honey which in turn were mixed into 39.76 pounds of dark chocolate at temperatures below about 43° C. Three pounds of butter and eight pounds of pecans were added and stirred into the confection and then cooled on a slab. The resulting produce was formed into balls, dipped in dark chocolate forming a truffle, and packaged six to a round box in brown candy cups.

EXAMPLE 5

Praline Confection

Nine and three quarter pounds of inulin were stirred into thirty pounds of honey. Eight pounds of pecans were added to this mixture. By introducing molded portions of this mixture into a vacuum micro-wave oven (making sure the temperature is not over 43° C.), a freeze dryer, or a freezer over a period of time, a non-sticky, solid praline is produced.

EXAMPLE 6

Dark Chocolate Confection 0.65 pounds of inulin and 0.33 pounds of non-fat dried milk were mixed with three pounds of honey (the inulin was 17.8% by weight of the honey), at temperatures below about 43° C., which in turn were mixed with four pounds of dark chocolate. 0.30 pounds of butter were then added and chews produced as in Example 2. The resulting product has not as strong a chocolate taste as in Example 2 and has a "creamier and softer taste."

EXAMPLE 7

Preparation of the Sweetener Composition with Water Soluble Inulin

The sweetener composition can be prepared with water soluble inulin. Granulated water soluble inulin product can be prepared according to the process of U.S. Pat. No. 6,659,488. Such water soluble inulin products have at least 75% by weight of water soluble polysaccharides with molecular weights of about 2288 and below. The water soluble inulin products can be admixed with honey according to the process of Example 1 to make the sweetener composition.

EXAMPLE 8

High Fructose Corn Syrup Containing Inulin

Sample A: About 1.96% by weight of granulated inulin was admixed into HFCS, introduced in a pint jar, and allowed to stand for about five years at about 16° C.

Sample B: About 13% by weight of granulated inulin was admixed into HFCS, introduced in a pint jar, and allowed to stand for about five years at about 16° C.

Sample C: HFCS was introduced in a ½ gallon jar, placed near the Samples A and B, above, and allowed to stand for about five years at about 16° C.

After five years, Samples A and B contained no crystallized product. Sample C had substantial glucose crystallized in the bottom of the jar with a liquid solution of fructose above.

EXAMPLE 9

Confection Containing Honey and Milk Powder

A. 750 grams of natural honey was determined to contain 610.5 grams or 81.45 by weight of solids and 139.5 grams or 18.6% by weight of water. 122 grams of instant skim milk powder was mixed with the honey. Upon standing, an undesirable water layer was formed containing at least some of the milk.

Confection Containing Honey, Inulin and Milk Powder

B. 750 grams of natural honey was determined to contain 610.5 grams or 81.45 by weight of solids and 139.5 grams or 18.6% by weight of water. 61 grams of instant skim milk powder and 61 grams of inulin were mixed with the honey. Upon standing, the mixture remained homogenous and there was no separation of a liquid layer.

In addition to use in food products, the sweetener compositions of the invention can be used as an electuary with compatible, ingestible medicines and pharmaceuticals.

It is intended that the foregoing detailed description be regarded as illustrative rather than limiting the scope of the invention, and that it be understood that the following claims, including all equivalents, are intended to define the spirit and scope of this invention.

The invention claimed is:

1. A composition comprising:
   glucose contained in said composition in amounts sufficient to crystallize;
   said glucose having a tendency to crystallize in said composition apart from the presence of inulin;
   inulin admixed with said composition in amounts of at least about 0.25% by weight of said glucose, and said inulin present in sufficient amounts to reduce the tendency of the glucose to crystallize; and
   water in amounts of at least about 6% by weight of the final composition.

2. The composition of claim 1, which contains said inulin in amounts of at least about 2% by weight of said glucose.

3. The composition of claim 1, which contains said inulin in amounts of at least about 5% by weight of said glucose.

4. The composition of claim 1, which contains said inulin in amounts of at least about 10% by weight of said glucose.

5. The composition of claim 1, which contains said inulin in amounts of at least about 15% by weight of said glucose.

6. The composition of claim 1, which contains said inulin in amounts of at least about 20% by weight of said glucose.

7. An electuary composition comprising the composition of claim 1 and at least one medicine or pharmaceutical.

8. A composition comprising:
   honey;
   said honey containing glucose having a tendency to crystallize in said honey;
   inulin admixed with said honey;
   said inulin comprising at least about 0.25% by weight of said honey;
   said inulin present in sufficient amounts to reduce the tendency of the glucose to crystallize; and
   water in amounts of at least about 6% by weight of the honey in the composition.

9. The composition of claim 8, which contains said inulin in amounts of at least about 2% by weight admixed with said honey.

10. The composition of claim 8, which contains said inulin in amounts of at least about 5% by weight admixed with said honey.

11. The composition of claim 8, which contains said inulin in amounts of at least about 10% by weight admixed with said honey.

12. The composition of claim 8, which contains said inulin in amounts of at least about 15% by weight admixed with said honey.

13. The composition of claim 8, which contains said inulin in amounts of at least about 20% by weight admixed with said honey.

14. The sweetener composition of claim 8 in which said inulin is admixed with said honey in sufficient amounts to reduce the tendency of the glucose to crystallize and to establish a water content of less than 17.1% of the honey.

15. The composition of claim 8 in which sufficient amounts of inulin are admixed with the honey to reduce the tendency of the glucose to crystallize, whereby said composition substantially retains its shape when molded.

16. A food product comprising a food containing the composition according to claim 8.

17. The food product of claim 16 in which the food is a confection.

18. The food product of claim 17 in which the confection is a candy.

19. The food product of claim 16 in which the food is a dark chocolate confection.

20. The food product of claim 16 in which the food is a praline confection.

21. The food product of claim 16 in which said food product is a dessert.

22. The food product of claim 16 in which said food product is a bread or muffin.

23. A confection comprising an admixture of chocolate, honey and inulin;
    said honey containing glucose and fructose;
    said glucose in said honey having a tendency to crystallize;
    said inulin present in said mixture in amounts of at least about 10% by weight of the honey;
    and said inulin present in sufficient amounts to reduce the tendency of the glucose to crystallize.

24. A sweetener composition comprising:
    honey;
    water soluble inulin admixed with the honey;
    said water soluble inulin comprising at least 75% by weight of polysaccharides having molecular weights of about 2288 and below;
    said water soluble inulin present in amounts of at least about 0.25% by weight of said honey;
    said water soluble inulin present in said honey in amounts sufficient to reduce a tendency of glucose in the honey to crystallize; and
    water in amounts of at least about 6% by weight of the honey in the final sweetener composition.

25. The composition of claim 24, which contains said inulin in amounts of at least about 2% by weight of said honey.

26. The composition of claim 24 which contains said inulin in amounts of at least about 5% by weight of said honey.

27. The composition of claim 24 which contains said inulin in amounts of at least about 10% by weight of said honey.

28. The composition of claim 24 which contains said inulin in amounts of at least about 15% by weight of said honey.

29. The composition of claim 24 which contains said inulin in amounts of at least about 20% by weight of said honey.

30. A process which comprises:
    providing a composition comprising glucose in amounts of about 95% to 5% by weight and fructose in amounts of about 5% to about 95% by weight and water;
    admixing inulin with said composition in amounts of from at least about 0.25% by weight of the glucose in said composition;
    said process maintaining processing times and temperatures at levels so that the final composition contains at least about 6% by weight of water.

31. The process of claim 30 in which said inulin is substantially water soluble and comprises at least about 75% by weight of water soluble polysaccharides with molecular weights of about 2288 and below.

32. The process of claims 30 or 31 in which said composition is honey.

33. The process of claims 30 or 31 in which said composition is high fructose corn syrup.

34. A composition comprising:

glucose in amounts from about 95% to about 5% by weight and fructose in amounts from about 5% to about 95% by weight;

said glucose having a tendency to crystallize in said composition;

inulin in amounts of at least about 0.25% by weight of said glucose;

said inulin present in sufficient amounts to reduce the tendency of the glucose to crystallize; and water in the composition in amounts of at least about 6% to about 25% by weight of the final composition.

35. A composition of honey comprising:

honey;

inulin admixed with the honey, said honey containing inulin in sufficient amounts to reduce the tendency of glucose in the honey to crystallize;

instant skim milk powder mixed with the honey; and water in amounts of at least about 6% by weight of the final composition.

* * * * *

UNITED STATES PATENT AND TRADEMARK OFFICE
CERTIFICATE OF CORRECTION

| | | |
|---|---|---|
| PATENT NO. | : 7,585,536 B2 | Page 1 of 1 |
| APPLICATION NO. | : 11/076480 | |
| DATED | : September 8, 2009 | |
| INVENTOR(S) | : Barnard S. Silver | |

It is certified that error appears in the above-identified patent and that said Letters Patent is hereby corrected as shown below:

On the Title page,

[*] Notice:   Subject to any disclaimer, the term of this patent is extended or adjusted under 35 USC 154(b) by 169 days Delete the phrase "by 169 days" and insert -- by 278 days --

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,585,536 B2 Page 1 of 1
APPLICATION NO. : 11/076480
DATED : September 8, 2009
INVENTOR(S) : Barnard S. Silver It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 278 days.

Signed and Sealed this

Fourteenth Day of September, 2010

David J. Kappos
*Director of the United States Patent and Trademark Office*